(12) United States Patent
Schmeisser et al.

(10) Patent No.: US 7,887,731 B2
(45) Date of Patent: Feb. 15, 2011

(54) METHOD OF MOLDING AN OVERMOLDED BEVERAGE CLOSURE

(75) Inventors: William C. Schmeisser, Barrington, IL (US); Thomas C. Stoneberg, Buffalo Grove, IL (US)

(73) Assignee: Rexam Closures and Containers Inc., Evansville, IN (US)

(*) Notice: Subject to any disclaimer, the term of this patent is extended or adjusted under 35 U.S.C. 154(b) by 825 days.

(21) Appl. No.: 11/740,074

(22) Filed: Apr. 25, 2007

(65) Prior Publication Data

US 2008/0011703 A1    Jan. 17, 2008

Related U.S. Application Data

(60) Provisional application No. 60/745,560, filed on Apr. 25, 2006.

(51) Int. Cl.
    *B29C 45/14* (2006.01)
    *B29C 45/16* (2006.01)
(52) U.S. Cl. .................. 264/255; 264/246; 264/247; 264/242; 264/275; 264/273; 264/328.7; 264/32.8
(58) Field of Classification Search ................... None
    See application file for complete search history.

(56) References Cited

U.S. PATENT DOCUMENTS

| | | | |
|---|---|---|---|
| 2,074,830 A | 3/1937 | Conner | |
| 2,394,135 A | 2/1946 | Baar | |
| 3,958,708 A | 5/1976 | Le Brun, Jr. | |
| 4,308,965 A | 1/1982 | Dutt | |
| 4,444,329 A | 4/1984 | Vollers | |
| 4,489,844 A | 12/1984 | Breskin | |
| 5,176,269 A | 1/1993 | Herman | |
| 5,431,293 A | 7/1995 | Piron | |
| 5,439,124 A * | 8/1995 | Mock | ........................... 215/40 |
| 5,501,377 A | 3/1996 | Dubach | |

(Continued)

OTHER PUBLICATIONS http://www.okeeffescompany.com/our_products/working_hands/; It shows how the lid fits on the package; Copyright (c) 2006 Working Hands Crème, Inc; USA.

*Primary Examiner*—Edmund H. Lee
(74) *Attorney, Agent, or Firm*—Chad D. Bruggeman; John F. Salazar; Middleton Reutlinger

(57) ABSTRACT

A method of molding a container closure providing selective fluid communication between an interior of a fluid container and an exterior environment, the method comprising: (i) configuring and closing a mold having a first cavity negatively defining a base of a container closure that includes a spout and a container mount, where the spout and container mount cooperate to define a conduit therethrough in fluid communication with an outlet orifice of the spout; (ii) injecting a first material into the first cavity to mold the base; (iii) cooling the first material in the mold to impart at least minimal rigidity to the base; (iv) reconfiguring at least a portion of the mold to define a second cavity adjacent to the first material, the second cavity negatively defining a cap covering the outlet orifice of the spout; (v) injecting a second material into the second cavity to mold the cap over the outlet orifice; (vi) cooling the second material in the mold to impart at least minimal rigidity to the cap; and (vii) removing the base and integrally formed cap from the mold.

13 Claims, 5 Drawing Sheets

U.S. PATENT DOCUMENTS

| | | | |
|---|---|---|---|
| 5,629,029 A | 5/1997 | Souder et al. | |
| 5,700,500 A | 12/1997 | Wilhelm | |
| 5,749,484 A | 5/1998 | Trout | |
| 5,772,076 A * | 6/1998 | Juk et al. | 222/153.06 |
| 5,810,185 A | 9/1998 | Groesbeck | |
| 5,868,273 A | 2/1999 | Daenen et al. | |
| 5,929,137 A | 7/1999 | Marsac et al. | |
| 5,975,381 A * | 11/1999 | Revenu | 222/563 |
| 6,029,866 A | 2/2000 | Wood et al. | |
| 6,036,036 A | 3/2000 | Bilani et al. | |
| 6,142,325 A | 11/2000 | Chomik | |
| 6,257,463 B1 | 7/2001 | De Polo | |
| 6,305,563 B1 | 10/2001 | Elliott | |
| 6,481,589 B2 | 11/2002 | Blomdahl et al. | |
| 6,832,692 B2 | 12/2004 | Ryall et al. | |
| 6,854,613 B2 | 2/2005 | Biesecker et al. | |
| 6,971,531 B1 | 12/2005 | Dubach | |
| 7,007,817 B2 | 3/2006 | Jochem | |
| 7,097,790 B2 | 8/2006 | Jochem | |
| 7,147,188 B2 | 12/2006 | Bloom et al. | |
| 2005/0121406 A1 | 6/2005 | Brozell et al. | |
| 2006/0076370 A1 * | 4/2006 | Etesse | 222/494 |

* cited by examiner

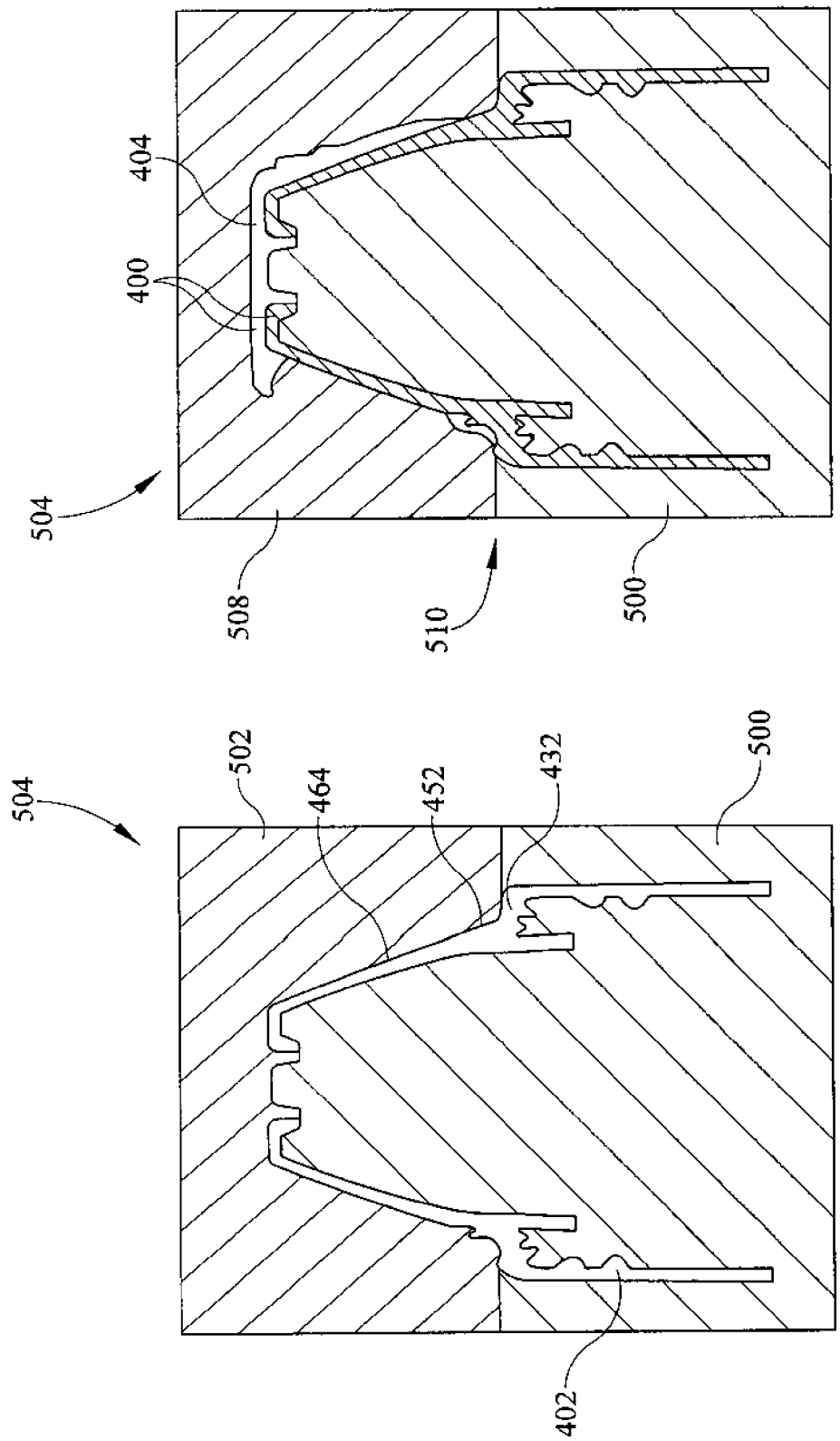

METHOD OF MOLDING AN OVERMOLDED BEVERAGE CLOSURE

CROSS-REFERENCE TO RELATED APPLICATIONS

This application claims priority to and benefit from U.S. provisional patent application 60/745,560, filed on Apr. 25, 2006, under 35 U.S.C. §119(e).

RELATED ART

1. Field of the Invention

The present application is related to closures for fluid containers utilizing overmolded components; and, more specifically, to closures where the spout and base component of the closure is molded in a first molding step and a repositionable or removable cap is molded over at least the spout of the closure in a second molding step.

2. Brief Discussion of Related Art

Container closures for certain beverage and condiment dispensers include a cylindrical base portion and a spout portion extending from the base portion. The base portion is typically threaded to be mounted to a mount of the dispenser. In this manner, fluid product from the interior of the dispenser is generally withdrawn through the spout portion, and when product is no longer desired to be withdrawn, the spout portion is closed by a removable or repositionable cap. The spout may be closed by a removable overcap or a retained cap repositionably mounted to the spout.

Certain container closures include base and spout portions that are molded with circumferential grooves or channels that are adapted to accept a circumferential ring of the retained cap. With such closures, the base and spout portion and the retained cap are individually molded apart from one another in separate processes. In other words, the base and spout portion is completely molded and the retained cap is completely molded, only thereafter to have the circumferential ring of the retained cap be frictionally fit within the groove of the base and spout portion to allow the cap to be mounted to the base and spout portion even when the cap does not close the orifice in the spout portion. It should be understood that the friction fit is the primary prior art means used to mount the cap to the spout portion.

SUMMARY

The present application is related to closures for fluid containers utilizing overmolded components; and, more specifically, to closures where the spout and base component of the closure is molded in a first molding step and a repositionable or removable cap is molded over at least the spout of the closure in a second molding step.

Accordingly, it is a first aspect of the invention to provide a method of molding a container closure providing selective fluid communication between an interior of a fluid container and an exterior environment, the method comprising: (i) configuring and closing a mold having a first cavity negatively defining a base of a container closure that includes a spout and a container mount, where the spout and container mount cooperate to define a conduit therethrough in fluid communication with an outlet orifice of the spout; (ii) injecting a first material into the first cavity to mold the base; (iii) cooling the first material in the mold to impart at least minimal rigidity to the base; (iv) reconfiguring at least a portion of the mold to define a second cavity adjacent to the first material, the second cavity negatively defining a cap covering the outlet orifice of the spout; (v) injecting a second material into the second cavity to mold the cap over the outlet orifice; (vi) cooling the second material in the mold to impart at least minimal rigidity to the cap; and (vii) removing the base and integrally formed cap from the mold.

It is a second aspect of the present invention to provide a method of overmolding a repositionable cap onto a container closure, the method comprising the steps of: (i) configuring and closing a mold housing a container closure base to at least partially define a mold cavity approximate a spout of the container closure base; (ii) injecting a first material into the mold cavity to overmold a cap over the spout that closes an outlet orifice of the spout; (iii) cooling the second material to impart at least minimal rigidity to the cap; and (iv) removing the base and overmolded cap from the mold.

It is a third aspect of the present invention to provide a method of imparting a tamper evident indicia to an injection molded product, the method comprising: (i) molding a first component of a product; and (ii) molding a second component of the produce over the first component to create a bond between the first component and the second component, where the second component includes at least one of a transparent property and a translucent property so that bonded portions of the first and second components exhibit a color that is a combination of colors of the overmolded portions of the first and second components, where breaking of the bond substantially removes the combination color in the areas where the bond has been broken.

It is a fourth aspect of the present invention to provide a closure for a fluid container comprising: (i) a container fitting including: (a) a distal container receiver adapted to couple the container fitting to a container, thereby providing a fluidic seal between the container fitting and the container; (b) a proximal spout including a conduit therethrough that is in communication with a proximal orifice of the spout through which material flowing through the conduit is adapted to egress from the container fitting; and (c) a lid that is repositionable between a closed position closing off the proximal orifice of the spout, and an open position opening the proximal orifice of the spout, where the lid is molded in the closed position over the proximal spout to provide a sealed fluidic interface between the lid and the spout.

BRIEF DESCRIPTION OF THE DRAWINGS

FIG. 5 is a cross-sectional view of an exemplary mold to fabricate a first aspect of the closure of FIG. 1;

FIG. 6 is a cross-sectional view of an exemplary mold to fabricate a second aspect of the closure of FIG. 1, thereby finishing the molding of the closure as shown in FIG. 1;

DETAILED DESCRIPTION

Figure 2:
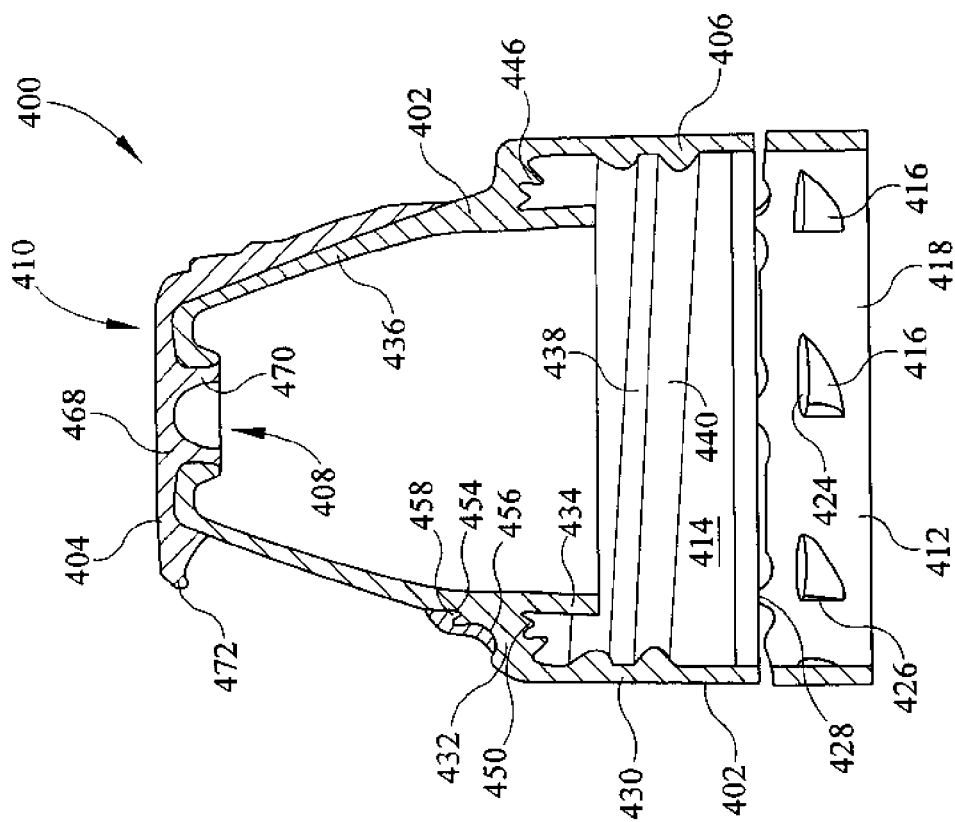
FIG. 2 is a cross-sectional view of the closure of FIG. 1 offset 90 degrees.
Figure 1:
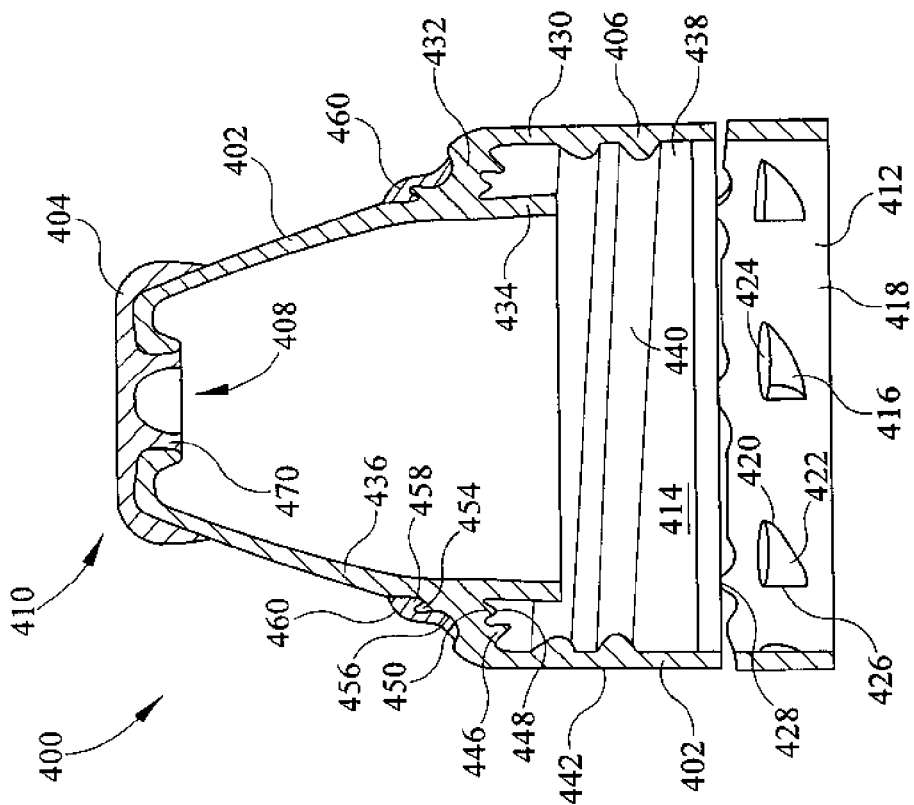
FIG. 1 is a cross-sectional view of an additional exemplary closure in accordance with the present invention.
Figure 3:
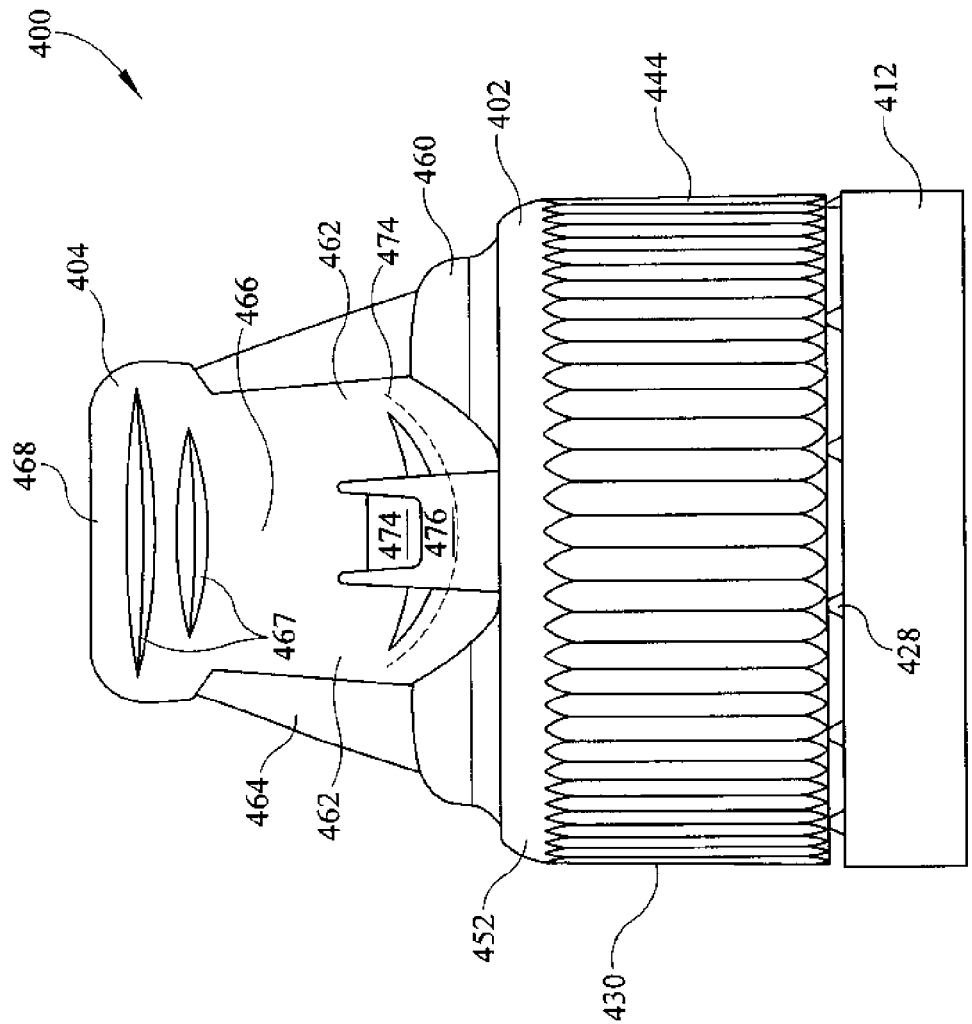
FIG. 3 is a rear perspective view of the closure of FIG. 1.

The exemplary embodiments of the present invention are described and illustrated below to encompass methods of fabricating container closure and the closures produced utilizing such methods. Of course, it will be apparent to those of ordinary skill in the art that the preferred embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

Referring to FIGS. 1-4, an exemplary closure 400 includes a base 402 and an overmolded repositionable cap 404 that are adapted to cooperate to retain the contents of a container (not shown) when the closure 400 is mounted to the container. The base 402 includes a circumferential wall 406 that forms a conduit through which fluid flows from the interior of the container and out an outlet orifice 408 in the proximal end 410 of the wall. The circumferential wall 406 includes a tamper-evident band 412 connected to a threaded, cylindrical container mating portion 414 that are adapted to be mounted to the throat of the container. The tamper-evident band 412 includes a plurality of projections 416 circumferentially spaced along an interior surface 418 thereof Each projection 416 includes a contoured leading edge 420 having an arcuate wall 422 that extends radially inward and intersects with a topside ledge 424 and a backside wall 426 that each extend perpendicularly inward from the interior surface 418. A plurality of bridges 428 extend between and connect the tamper-evident band 412 to the container mating portion 414. These bridges 428 are adapted to be broken when the closure 400 is first removed from the container, thereby separating the tamper-evident band 412 from the container mating portion 414. The bridges 428 are broken when either or both of the topside ledge 424 and the backside wall 426 catch one or more corresponding projections from the throat of the container so that continued upward movement of the closure 400 tensions the bridges 428 beyond their breaking points.

The container mating portion 414 includes a cylindrical wall 430 that intersects with a radially inwardly extending wall 432 that transitions concurrently into a circumferential, axially, extending flange 434 and an opposed frustoconical wall 436. The cylindrical wall 430 includes an interior surface 438 having helical threads 440 extending radially inward that are adapted to interact with a corresponding helical projection on the throat of the container to allow the closure 400 to be rotationally mounted and dismounted from the container. An exterior surface 442 of the cylindrical wall 430 includes a plurality of vertically oriented and spaced apart ribs 444 adapted to enable a user to more easily grip and rotate the closure 400 with respect to the container.

The cylindrical wall 430, the radially inwardly extending wall 432, and the circumferential flange 434 cooperate to define a circumferential inverted U-shaped profile that is adapted to be seated upon the top wall of the mouth of the container. A circumferential projection 446 extends from an interior surface 448 of the radially inwardly extending wall 432 and cooperates with the flange 434 to guide a top wall of the mouth of the container into contact with a sealing ring 450 also extending from the radially inwardly extending wall 432. The sealing ring 450 is adapted to compress and seal against the top wall of the mouth of the container when the closure 400 is mounted to the container.

An exterior surface 452 of the radially inwardly extending wall 432 includes a circumferential lip 454 that separates complementary circumferential grooves 456, 458. Each groove 456, 458 receives part of a retaining ring 460 molded thereover to mount the repositionable cap 404 to the base 402.

As will be discussed in more detail below, the lip 454 increases the surface area for bonding between the retaining ring 460 and the base 402, thereby providing a more secure connection. Two legs 462 that are bonded to an exterior surface 464 of the frustoconical wall 436 extend from the retaining ring 460. The legs 462 converge to form a backbone 466 that extends parallel to exterior surface 464 of the frustoconical wall 436, where the proximal segment of the backbone 466 includes rigidity ribs 467 that transition into a lid 468 that is removably bonded to the proximal end 410 of the circumferential wall 406 to close the outlet orifice 408 of the spout formed by the frustoconical wall 436 and completely cover the entire exposed surface of the proximal end 410. The lid 468 includes a downwardly extending circumferential plug 470 that is adapted to be frictionally received by the outlet orifice 408 to seal the outlet orifice. A tapered lip 472 of the lid 468 overhangs the exterior surface 464 of the frustoconical wall 436 and is adapted to receive an upward manual force. When manual force is applied upwardly against the lip to force the lid off of the spout and the plug 470 from the outlet orifice 408, the reduced thickness of the legs 462 to provide a living hinge 474 about which the backbone 466 and lid 468 pivot with respect to the retaining ring 460 and the base 402. The backbone 466 includes an outwardly extending prong 474 that is adapted to be pivoted inwardly and be received by a corresponding depression 476 within the exterior surface 464 of the frustoconical wall 436, thereby retaining the hinge in the open position. When the backbone 466 and lid 468 pivot approximately 90° or more, the prong 474 continues to extend outward from the backbone 466 and is wedged against the exterior surface 464 of the frustoconical wall 436 to retain the backbone 466 and lid 468 in the pivoted position. A force applied to one or more of the top of the lid 468 and the back side of the backbone 466 is operative to deform the prong 474 out from the depression 476 allowing the backbone 466 and lid 468 to pivot to the closed position.

U.S. Pat. No. 6,478,184, entitled "Two-Piece Hinged Closure", discloses retention structure for a hinged closure that is similar to that disclosed herein. The '184 patent describes a two-piece closure that incorporates a cam tab similar to the extending prong 474 of the instant invention to retain the cap in the open position. U.S. Pat. No. 6,478,184 is herein incorporated by reference.

Referencing FIGS. 4-7, the exemplary closure 400 is fabricated in a two-shot injection molding process. In the first shot, the first and second blocks 500, 502 of the mold 504 are brought together to provide an internal cavity having negative dimensions and features representative of the base 402 discussed above. A polymer, such as polypropylene, is injected into the cavity to form the base 402. The polymer is allowed to sufficiently harden so that the mold 504 may be opened without substantially deforming the base 402. The first block 500 of the mold 504 is thereafter withdrawn from the second block 502 to remove the base 402 from the second block 502 and expose the exterior surface 452 of the radially inwardly extending wall 432 and the exterior surface 464 of the frustoconical wall. A third block 508 of the mold 504 is then brought into contact with the first aspect 500 to provide an internal cavity having dimensions and features representative of the repositionable cap 404 discussed above, adjacent to the exposed portions of the base 402. A second polymer, such as polyethylene, is injected into the cavity to form the repositionable cap 404 in a second shot over the exposed portions of the base 402. The polymer forming the repositionable cap 404 is allowed to sufficiently harden so that the mold 504 may be opened without substantially deforming the cap 404. Thereafter, the third block 506 is separated from the first block 500 and a finished closure 400 is removed from the first block 500.

Referring to FIGS. 1-7, the two-shot process discussed above molds the repositionable cap 404 to the base 402 so as to form a band and a seal at the interface between the two components. This is particularly advantageous where, as here, the molding process molds the cap 404 in not only a closed position, but with a fluidic seal with respect to the outlet orifice 408 in the proximal end 410 of the base 402 and the lid 468.

Figure 7:
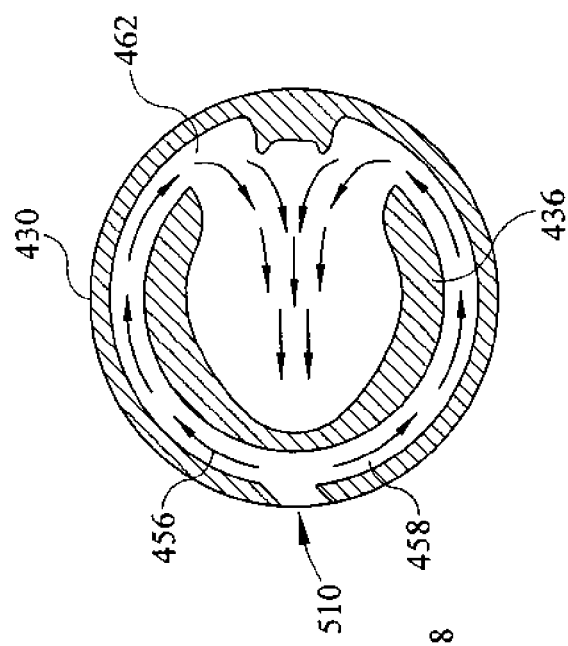
FIG. 7 is an overhead, cut-away view of the mold of FIG. 6 showing the flow of the polymer to form the second aspect of the closure.
Figure 4:
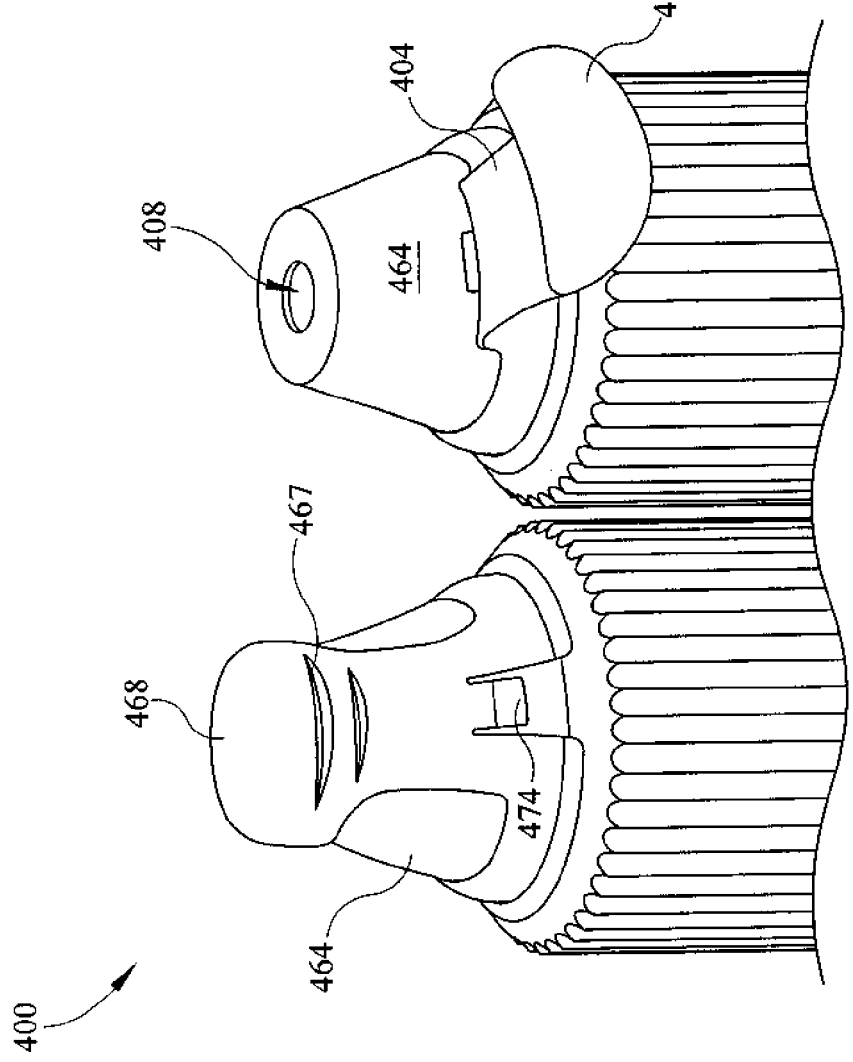
FIG. 4 is an elevated perspective view of the closure of FIG. 1, where the lid is in the open and closed position.

FIG. 7 provides an exemplary injection point 510 where the second polymer is first introduced to fill those aspects of the circumferential grooves 456, 458 farthest from the legs 462. It is important to understand that injection molded polymers flow like streams of viscous fluids. As more polymer is introduced, the pressure and additional polymer force the initially injected polymer outward and around the frustoconical wall 436 in two arcuate polymer streams. As further polymer is introduced, the polymer at the lead end of each stream begins to cool and becomes more resistant to flow. The polymer material continues to flow in these two streams to form the legs 462, until the two polymer streams converge to form the backbone 466 and lid 468, thereby completely covering and sealing the outlet orifice 408 in the proximal end 410 of the base 402. The mold 504 is designed so that the molding of the lid 468 and the backbone 466 coincide with the lead end polymer becoming increasingly viscous so much so that the injection molding equipment can no longer inject polymer to force the lead end material further into the mold.

In a further exemplary application of the two-shot molding process, the repositionable cap 404 and the base 402 include a tamper evident indicia visually apparent when the seal between the cap 404 and base 402 has not been compromised. For example, the base may be fabricated from a blue polyethylene material and the cap may be fabricated from a yellow polyethylene material that is substantially transparent and/or translucent. Thus, the overmolded portions of the cap will exhibit a green color combination of blue and yellow materials being bonded to one another. In this example, the yellow polyethylene material is transparent so that an overhead view of the closure 400 after molding would reveal a dark green ring around a yellow circle, evidencing that the seal was intact between the cap 404 and base 402, particularly with respect to the seal between the outlet orifice 408 and the circumferential plug 470. When a user of the closure 400 first peels the lid 468 back to displace the circumferential plug 470 from the outlet orifice 408, thereby discontinuing the seal therebetween, the overhead view of the closure 400 would reveal a very faint green ring around a yellow circle (or no green color at all), evidencing that the seal was no longer intact between the cap 404 and base 402, particularly with respect to the seal between the outlet orifice 408 and the circumferential plug 470. The absence of the dark green ring would alert a potential user than the lid has been previously been opened.

Simply put, the visual indicia is the difference in appearance when the cap and base continue to have a bond or a seal therebetween and the appearance when no bond/seal is present between the cap and base. In other words, the absence of presence of a visual cue alerts the user of the sealed or unsealed state. Along these same lines, it is also within the scope of the invention that the dominant visual cue be apparent after the cap has been initially repositioned from the base, thereby discontinuing the bond/seal therebetween. Those of ordinary skill will readily understand that various color combinations can be utilized to provide a color change once a molded seal is discontinued, such as, without limitation, a red base 402 and a yellow cap 404, and a blue base 402 and a red cap 404.

Figure 8:
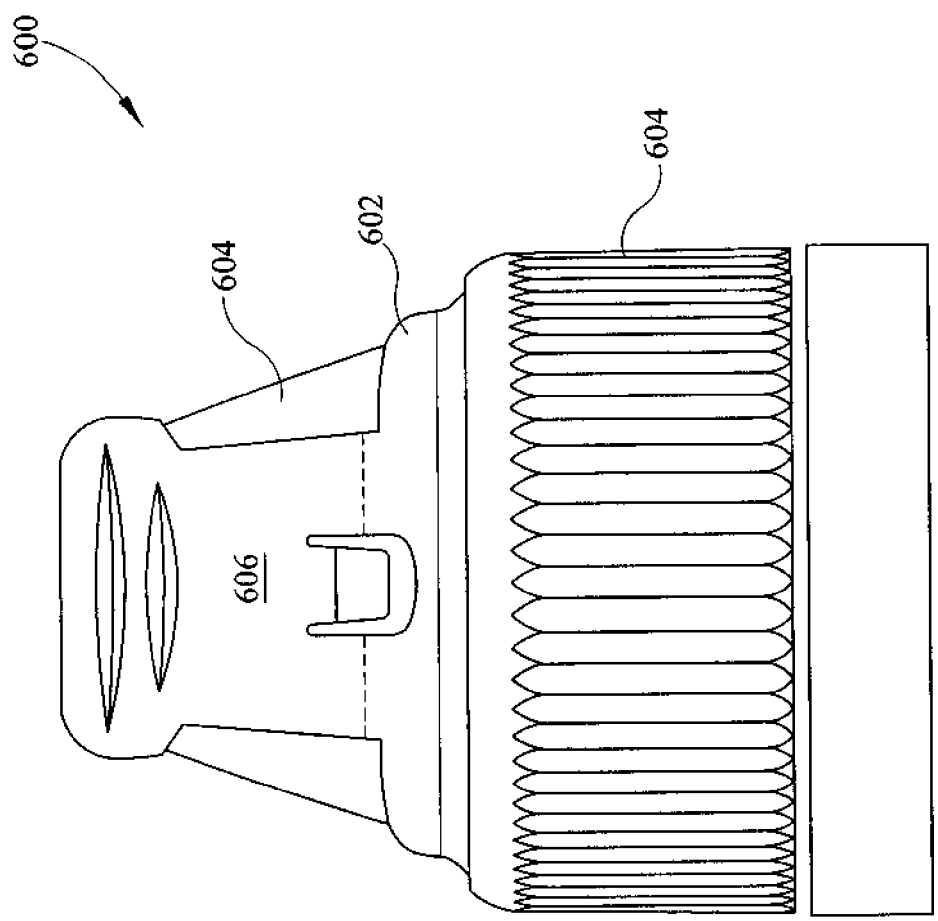
FIG. 8 is rear view of an alternate exemplary hinge structure for the closure of FIG. 1.

Referring to FIG. 8, an alternate exemplary hinge structure 600 is shown. This exemplary hinge 600 is analogous to the living hinge 474 of FIG. 1 and may be used in lieu of the living hinge 474 of FIG. 1. The hinge line is shown with a dotted line and is vertically elevated with respect to the living hinge 474 of FIG. 1. It should be noted that his hinge structure 600 provides for a continuous ring 602 around the circumference of the base 604 to inhibit rotation of the cap 606 about the base.

An alternate exemplary closure 700 in accordance with the present invention includes a tear-away tamper evident feature 702 as shown in FIG. 9. The closure 700 is similar in structure to that of the first exemplary closure 400 by including a base 702 and an overmolded repositionable cap 704. The base 702 for purposes of explanation includes the same structural features as the base 402 discussed in the first exemplary embodiment. The cap 704, however, is different in that the entire cap may be molded and a subsequent cutter operation is applied to the cap to define the tear away portion. This cutting action may tear off a tab, or the tab may be torn off after the cap is pivoted rearward away from the spout.

Following from the above description and invention summaries, it should be apparent to those of ordinary skill in the art that, while the apparatuses herein described and illustrated constitute exemplary embodiments of the present inventions, it is understood that the inventions are not limited to these precise embodiments and that changes may be made therein without departing from the scope of the inventions as defined by the claims. Additionally, it is to be understood that the inventions are defined by the claims and it is not intended that any limitations or elements describing the exemplary embodiments set forth herein are to be incorporated into the meanings of the claims unless explicitly recited in the claims themselves. Likewise, it is to be understood that it is not necessary to meet any or all of the recited advantages or objects of the inventions disclosed herein in order to fall within the scope of any claim, since the inventions are defined by the claims and since inherent and/or unforeseen advantages of the present inventions may exist even though they may not have been explicitly discussed herein.

What is claimed is:

1. A method of molding a container closure providing selective fluid communication between an interior of a fluid container and an exterior environment, the method comprising:
    configuring and closing a mold having a first cavity negatively defining a base of a container closure that includes a spout and a container mount, where said spout and container mount cooperate to define a conduit therethrough in fluid communication with an outlet orifice of said spout;
    injecting a first material into said first cavity to mold said base;
    cooling said first material in said mold to impart at least minimal rigidity to said base;
    reconfiguring at least a portion of said mold to define a second cavity adjacent to said first material, said second cavity negatively defining a cap covering said outlet orifice of said spout;
    injecting a second material into said second cavity to mold said cap in a closed position over said outlet orifice;
    providing a sealed fluidic interface between said second material of said cap and said first material of said spout outlet orifice when said cap is in said closed position, when said cap is in said closed position said sealed fluidic interface exhibits an untamper evident indicia visually apparent to the user;

cooling said second material in said mold to impart at least minimal rigidity to said cap;

removing said base and integrally formed cap from said mold;

wherein breaking said sealed fluidic interface and opening said spout outlet orifice by repositioning said cap from said closed position to an open position; and wherein repositioning said cap from said open position to said closed position, when said cap is returned to said closed position after being previously opened said sealed fluidic interface exhibits a tamper evident indicia visually apparent to the user indicating that said sealed fluidic interface has been previously broken.

2. The method of claim 1, wherein said base is retained by said mold during the reconfiguring act.

3. The method of claim 1, wherein the act of injecting said second material into said second cavity includes injecting said second material at least partially into said outlet orifice of said spout to plug said spout.

4. The method of claim 1, wherein:
said first material exhibits a first color;
said second material exhibits a second color, different than said first color; and
said untamper evident indicia of said sealed fluidic interface exhibits a third color, which is a combination of said first and second colors.

5. The method of claim 4, wherein:
said tamper evident indicia of said sealed fluidic interface is a substantial absence of said third color illustrating said sealed fluidic interface has been previously broken.

6. The method of claim 5, wherein said second material is at least one of substantially transparent and substantially translucent.

7. A method of overmolding a repositionable cap onto a container closure, the method comprising the steps of:
configuring and closing a mold having a container closure base to at least partially define a mold cavity approximate a spout of said container closure base;
injecting a first material into said mold cavity to overmold a cap over said spout that closes an outlet orifice of said spout;
cooling said first material to impart at least minimal rigidity to said cap; and
removing said base and overmolded cap from said mold;
revealing a first color indicia of a sealed spout outlet orifice when said cap is in its original injected molded position with said container closure base; and
revealing a second color indicia of a tampered spout outlet orifice when said cap that has been previously repositioned from said base returns to said original injected molded position with said base, said second color indicia is different from said first color indicia.

8. The method of claim 7, wherein:
said spout exhibits a first color;
said first material of said cap exhibits a second color, different than said first color; and
overmolded portions of said first material exhibit a third color, which is a combination of said first and second colors.

9. The method of claim 8, wherein
said overmolded portions of said first material form a bond to said spout having said first color indicia; and
displacement of said cap with respect to said spout to break said bond between said first material and said spout results in revealing said second color indicia in areas where said bond is broken.

10. The method of claim 9, wherein:
said first material is at least one of transparent yellow colored and translucent yellow colored; and
said container closure base is a blue color.

11. The method of claim 9, wherein:
said first material is at least one of transparent yellow colored and translucent yellow colored; and
said container closure base is a red color.

12. The method of claim 9, wherein:
said first material is at least one of transparent red colored and translucent red colored; and
said container closure base is a blue color.

13. A method of imparting a tamper evident indicia to an injection molded product, the method comprising:
molding a first component of a product; and
molding a second component of said product over said first component to create a bond between overmolded portions of said first component and said second component, where said second component includes at least one of a transparent property and a translucent property so that said bond of said overmolded portions of said first and second components exhibits a first color that is a combination of colors of said overmolded portions of said first and second components;
wherein breaking of a portion of said bond between said overmolded portions and reconnecting said overmolded portions that were previously broke apart exhibits a second color in said portion of said bond that has been previously broken to exhibit tamper evidence to the user, said second color is different from said first color.

* * * * *